United States Patent [19]

Norton

[11] 4,307,299

[45] Dec. 22, 1981

[54] SYSTEM FOR GENERATING ELECTRICAL ENERGY UTILIZING COMBINED WATER POWER AND COMBUSTIBLE FUEL SOURCES

[76] Inventor: Joseph R. Norton, 724 Skyline Pl., Stillwater Okla. 74074

[21] Appl. No.: 100,260

[22] Filed: Dec. 4, 1979

Related U.S. Application Data

[63] Continuation of Ser. No. 818,589, Jul. 25, 1977, abandoned.

[51] Int. Cl.³ .............................................. F02C 3/12
[52] U.S. Cl. ........................................ 290/52; 60/398
[58] Field of Search ...................... 290/52, 43; 60/398

[56] References Cited

U.S. PATENT DOCUMENTS 3,643,426 2/1972 Janelid ................................. 290/52
3,939,356 2/1976 Loane .................................. 290/52

*Primary Examiner*—J. D. Miller
*Assistant Examiner*—Donald L. Rebsch
*Attorney, Agent, or Firm*—Head & Johnson

[57] ABSTRACT

A system for generating electrical energy which combines water power and combustible fuel in a manner to utilize, according to varying conditions, the best combination of energy sources for maximum economy of electrical generation, including an elevated body of water having connection to a hydraulic generating means positioned at a lower elevation, the water flowing from the body of water to the hydro-electric generating means through a penstock, a fuel powered gas turbine generator adapted to use combustible fuel and compressed air as a means of generating electricity, a hydraulic air compressor means adjacent to the body of water, a penstock having a water inlet connected to the body of water and having a water outlet, the hydraulic head of which is below the water inlet, and an air outlet connected to the gas turbine generator and means to selectably divert the water flow to the hydro-electric generator and/or the hydraulic air compressor so that electricity may be generated selectably utilizing the energy source of water power and combustible fuel according to parameters of availability and economics.

3 Claims, 4 Drawing Figures

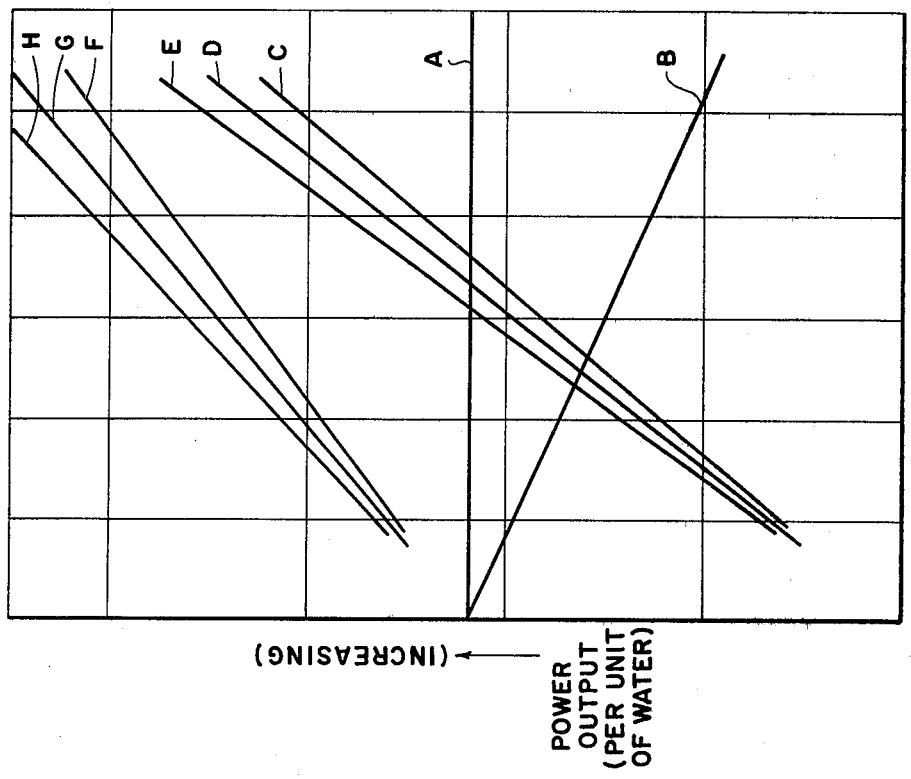
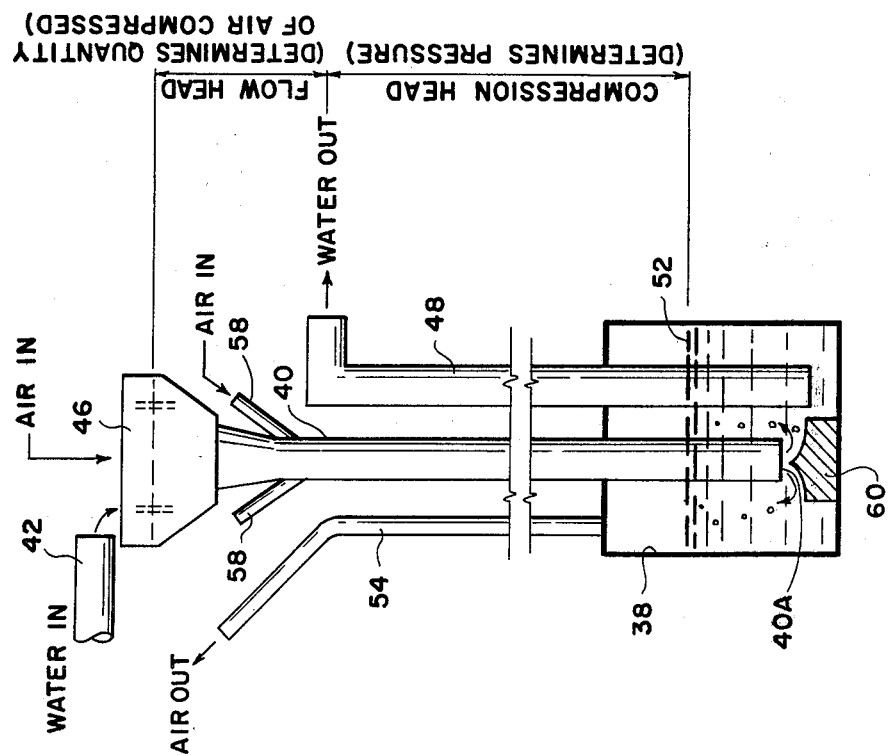

SYSTEM FOR GENERATING ELECTRICAL ENERGY UTILIZING COMBINED WATER POWER AND COMBUSTIBLE FUEL SOURCES

This application is a continuation of application Ser. No. 818,589, filed July 25, 1977, now abandoned.

BACKGROUND AND OBJECTS OF THE INVENTION

Electricity is commercially generated using rotating generating equipment. The power of rotation may be supplied in a variety of ways, a common method being the use of combustible fuel, usually gas or oil in a gas turbine generator. Another frequently employed means is a hydraulic turbine generator utilizing the energy of the head of an elevated supply of water.

One problem encountered by the electrical generation and distribution industry is that of meeting peak load demands. For this purpose a number of pump-back facilities have been established. These facilities store energy in the form of water head, utilizing energy during the periods when it is most readily and economically available and when surplus generating capacity exists, and recovering the energy to meet peak load demands. Typically, these pumpback facilities use electrical power to drive a generator which, when energized, functions as an electric motor, to power the turbines which, when driven, function as a pump, to move water from a lower elevation through a penstock to an upper elevation, usually an elevated lake. When the flow of water is reversed, the turbine drives the generator to recover the energy. While the recovered energy is always less than the amount of energy required to move the water to the upper elevation, nevertheless the advantage of having the stored energy available to meet peak loads is economically justified compared to the cost of building and maintaining additional generating facilities to meet peak load demands.

Most generating facilities in the United States at the present time utilize some sort of combustible fuel, and frequently employed means for generating electricity utilizes a gas turbine as a prime power source. Gas turbines utilize a gas fuel input, usually natural gas, but can be devised to employ gas obtained by coal gassification or liquid fuel in vapor form. To achieve maximum efficiency in the gas turbine, air must be supplied under pressure to mix with the fuel to achieve the combustion necessary to produce the required energy output. One problem with the use of gas turbines is that of generating the compressed air. A substantial amount of the energy which otherwise would be available from a gas turbine generator is used in compression of air employed in the gas turbine itself.

The present invention is directed towards the use of an alternate means of providing the compressed air required by a gas turbine generator and particularly concerns the combination of the gas turbine generator and a water turbine generator with a hydraulic air compressor as a means of compressing air for use in the gas turbine generator. Hydraulic air compressors are well known, therefore, the present invention is not directed to the concept of a hydraulic compressor per se but to a unique combination of hydraulic and gas turbine generation of electricity utilizing hydraulic head energy to provide compressed air for the gas turbine so that the combination of hydraulic and gas turbine generated electricity may be manufactured according to optomized factors of energy demand, fuel costs, and water availability.

It is therefore an object of this invention to provide a system for generating electrical energy utilizing combined water power and combustible fuel.

This object as well as other and more specific objects of the invention will be fulfilled in the following description and claims, taken in conjunction with the attached drawings.

SUMMARY OF THE INVENTION

A system for generating electrical energy utilizing a combination of water power and combustible fuel sources having an elevated body of water, such as a lake of water, a hydraulic generating means including a turbine and a generator, a penstock connecting the elevated body of water with the hydraulic generating means, a fuel powered gas turbine generator having a fuel input and a compressed air input, a hydraulic air compressor means adjacent the body of water, and including means for introducing a flow of water from the elevated body of water into the compressed air generator for delivery of compressed air to the gas turbine generator, and valves in the penstock to direct the flow between the elevated body of water and the hydraulic air compressor system.

BRIEF DESCRIPTION OF THE DRAWINGS

FIG. 2 is a view of one type of hydraulic air compressor system which may be employed with the invention, it being understood that the hydraulic air compressor system of and within itself is a known, though not frequently utilized expedient, and that it is employed in this invention as an element in the combination which provides a system of electrical generation having economic advantages.

FIG. 3 is a chart showing in Y axis the increasing power output per unit of water flow and in the X axis the increase of flow head, and showing curves of the gas turbine output for various rates of compressed air input to the turbine and the total power output for the combined gas turbine and hydraulic turbine.

DETAILED DESCRIPTION

Figure 1:
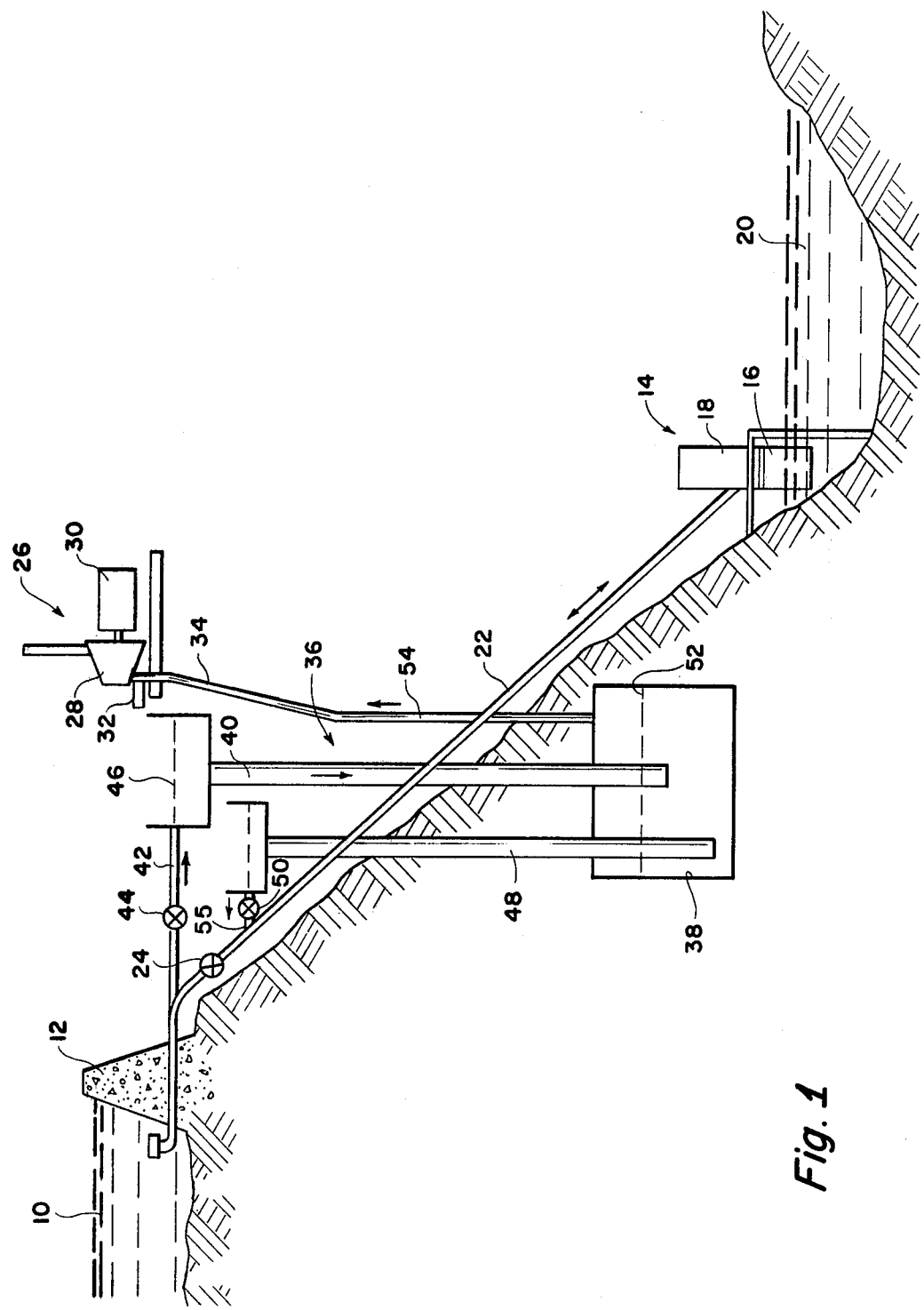
FIG. 1 is a diagrammatic elevational view of a system employing one embodiment of the invention showing an elevated body of water, a turbine generator located at an elevation below the elevated body of water, a gas turbine generator and a hydraulic air compressor system.

Referring to the drawings and first to FIG. 1, a system embodying the invention is diagrammatically illustrated. A body of water 10, such as a reservoir is located at an elevated position, the reservoir being formed by a dam 12. Adjacent the body of water 10 and in a lower elevation is a hydro-electric system generally indicated by the numeral 14 which includes a water-driven turbine 16 and a generator 18. As will be described subsequently, the generator 18 may also function as a motor and the turbine 16 as pump. Water flowing out of the water turbine 16 flows into a lower body of water 20 located at a lower elevation than the upper body of water 10. Connecting the upper body of water 10 with the hydro-electric system 14 is a conduit or penstock 22. utilized expedient, and that it is employed in this invention as an element in the combination which provides a system of electrical generation having economic advantages.

FIG. 3 is a chart showing in Y axis the increasing power output per unit of water flow and in the X axis the increase of flow head and showing curves of the turbine output for various levels of compressed air input to the turbine and the total power output for various levels of compressed air input to the turbine.

Figure 4:
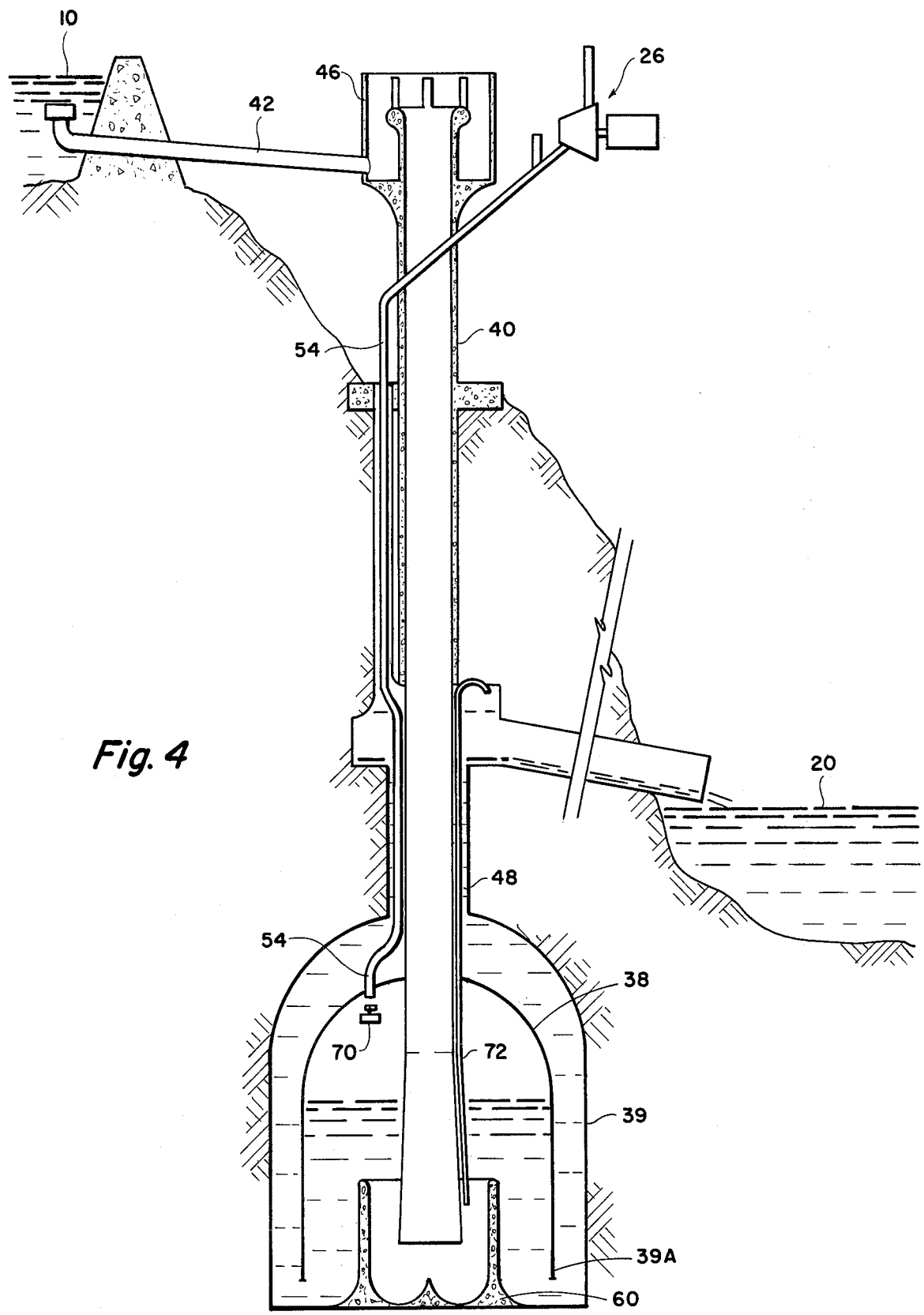
FIG. 4 is a diagrammatic elevational view of a system employing another embodiment of the invention showing an elevated body of water, a gas turbine generator, and a hydraulic air compressor system, utilizing the total flow head available from the elevated source.

FIG. 4 is a diagrammatic elevational view of a system employing another embodiment of the invention showing an elevated body of water, a gas turbine generator, and a hydraulic air compressor system.

DETAILED DESCRIPTION

Referring to the drawings and first to FIG. 1, a system embodying the invention is diagrammatically illustrated. A body of water 10, such as a reservoir is located at an elevated position, the reservoir being formed by a dam 12. Adjacent the body of water 10 and in a lower elevation is a hydro-electric system generally indicated by the numeral 14 which includes a water-driven turbine 18 and a generator 16. As will be described subsequently, the generator 16 may also function as a motor and the turbine 18 as a centrifugal pump. Water flowing out of the water turbine 18 flows into a lower body of water 20 located at a lower elevation than the upper body of water 10. Connecting the upper body of water 10 with the hydro-electric system 14 is a conduit or penstock 22.

Located adjacent to the upper and lower bodies of water 10 and 20, at an elevation which is not material, is a fuel powered gas turbine generator indicated by the numeral 26. The gas turbine generator 26 includes a fuel powered gas turbine 28 connected to a generator 30. The turbine 28 has a fuel inlet 32 connected to a fuel source and a compressed air inlet 34.

Also located adjacent the upper and lower bodies of water 10 and 20 is a hydraulic air compression system generally indicated by the numeral 36. This includes a vessel 38 at a lower elevation than the body of water 10 and which may be a cavern mined in the earth having a water inlet conduit 40. A flow tube 42 is connected between the elevated body of water 10 and an air collector 46. Water passes through the air collector 46 downwardly through conduit 40 into the vessel or cavity 38. A valve 44 is interposed in the tube 42 between air collector 46 and the body of water 10. Water flows out of the vessel 38 through outlet conduit 48 and through a second conduit 55 back into penstock 22. A valve 24 is interposed in penstock 22 between the juncture of conduit 55 and penstock 22 and the body of water 10.

Vessel 38 functions to separate air which is compressed by water flowing downwardly through conduit 40, the air being released within the vessel 38 and accumulating in the upper portion thereof, the water level being indicated by the numeral 52. Air flows out of the vessel 38 through conduit 54 which connects with the gas turbine air inlet 34.

As previously indicated, the hydraulic air compression concept is a known expedient although not frequently employed.

Referring to FIG. 2, more details of an air compression system are shown. Water from conduit 42 passes into an open air collector 46 which is of a size so that it does not overflow. The air collector 46 is at the top of vertical conduit 40 so that water flowing into it passes immediately downwardly through the conduit 40 into vessel 38. As previously indicated, the vessel 38 can be any enclosure and in a preferred arrangement may be a cavity excavated in the earth adjacent to the upper and lower bodies of water 10 and 20. In addition, in order to induce more air into the column of water flowing downwardly in conduit 40, air inlet pipes 58 may be employed, the area adjacent to the connection of the air inlet pipes and conduit 40 being in the nature of a venturi so that the downward passage of water through conduit 40 draws air into the column of water. As the column of water moves downwardly in conduit 40, the air entrapped therein is compressed. When the water is discharged out the lower end 40A of the conduit, it engages the diverter 60 and turns back upwardly within vessel 38. Normally, of course, vessel 38 would be greater in size in proportion to the conduits than that illustrated in FIG. 2. As the pressure of the water flowing out through the conduit 40 is reduced in vessel 38, the compressed air is released and collects in the upper portion of the vessel 38 above the water level 52. Compressed air is conveyed out through air outlet conduit 54 previously described, and the water flow out of the vessel 38 through water outlet conduit 48. For more detailed description of the design construction, operation and function of hydraulic air compressors, reference may be had to a book entitled "Air Compressors", Eugene W. F. Feller, published by McGraw-Hill, 1944.

FIG. 3 shows the various parameters of operation of a hypothetical system employing the arrangements illustrated in FIGS. 1 and 2 wherein the following curves are illustrated. A is the output of a hydraulic turbine alone for a specific head. B is the output of the hydraulic turbine as flow head of the water flowing out of the elevated pool 10 is increased to the hydraulic air compressor 36. C is the output of the gas turbine 26 as the flow head increases with air compression at air inlet 34 equal to 5 atmospheres. D is the same with the air input at 6 atmospheres and E is at 7 atmospheres. F is the total output of the system; that is, the combined power output indicated by curve B and curve C when the air pressure to the gas turbine is 5 atmospheres; G when it is at 6 atmospheres; and H when it is 7 atmospheres. These pressures are illustrative only and may be varied to optimize flow rates and output.

Under certain conditions, it becomes more expedient and economical to increase the flow head through the hydraulic air compressor to utilize the full head between the upper and lower water levels. FIG. 4 illustrates such a working system. Water from conduit 42 passes into an open air collector 46. The air collector 46 is at the top of vertical conduit 40 so that water and entrained air flowing into said conduit pass downwardly through same into bell vessel 38. In this embodiment, the bell vessel which may be constructed of steel is enclosed within an underground cavity 39. A diverter 60 is provided at the outlet of conduit 40. As the flow is diverted, the entrained air separates from the water in the bell vessel and rises to the upper portion thereof. A conduit 54 in open communication with the upper portion of the bell vessel transfers the compressed air trapped therein to the gas turbine generator referred to generally by reference numeral 26. Water flowing from conduit 40 passes under the lower edge 39A of the bell vessel into the annules formed by the bell vessel 39 and cavity 39 and thence upward via annular conduit 48.

Use of the full head existing between water level 10 and water level 20 permits a greatly increased volume of air flow, hence increased power output of the gas turbine per unit of water flowing. A float valve 70 or similar device is provided to prevent bell vessel 39 from completely filling with water. Safety tube 72 in open communication with the atmosphere above the elevation reservoir 20 extending through the bell vessel and terminating below the normal water level maintained therein will prevent any blowbacks as a result of excessive compressed air accumulations.

The system illustrated in FIG. 1 is particularly useful as a pump-back system. When so used, electrical energy is applied to generator 18, causing it to function as a motor, driving turbine 16, causing it to function as a pump. Water is pumped from the lower body of water 20 back up penstock 22 into upper body of water 10. In this way surplus electrical energy which, for example, may be available from fuel generated sources during the hours of twelve midnight to ten o'clock in the morning during summer months is stored in the form of water head in body 10. When additional generating capacity is needed, such as during peak air conditioning loads in the afternoon and early evening, water is passed out of reservoir 10, down through penstock 22 to turn the hydraulic turbine 16 and generator 18. While some energy is lost, the pump back system is a means to efficiently store energy to meet peak demands.

As to gas turbine generator system 26, the available capacity is directly related to the head or elevation of the body of water 10. In the hydraulic air compressor 36, the head causing flow through the compressor determines the quantity of air that can be compressed, while the pressure to which the air is compressed depends upon the compression head held on the air-water separator in vessel 38. In general, the compression head is greater than the flow head, thereby making it possible to return the water through conduit 55 to a level somewhat less than the water entering the air compressor through conduit 42.

It is this feature of a low flow head requirement that makes it possible to utilize a hydraulic air compressor with a hydraulic turbine in which water is used to compress air and return the water at a slightly lower elevation to the same penstock and use the water again to power the hydraulic turbine 16. In this case, the capacity of the hydraulic turbine is reduced by the flow head required by the hydraulic air compressor 36 but at the same time a quantity of compressed air is continuously produced by the hydraulic air compressor which is available through conduit 54 for use in gas turbine system 26.

The arrangements described and depicted in FIG. 1 are most adaptable to a pump-back operation of producing power by the hydro-electric industry. However, it is not limited in this operation only.

In operation, water is taken from the elevated source 10 and diverted by closing valve 24 and opening valves 44 and 50 and hence through the hydraulic air compressor 36 entraining air as it enters the fall tube 40 and compressing that air to whatever hydrostatic head exists at the end of this tube in vessel 52. The fall tube terminating in the vessel 52 expels the air at a pressure determined by the hydrostatic head maintained by the riser tube 48. In vessel 52 the air collects in the top and is drawn off through the air flow pipe 54 while the water enters the riser 48 and returns to penstock 22 at a level below the entrance level sufficient to maintain the required flow velocity through the air compressor.

The water returned through the riser 48 and conduit 55 is then available to be re-directed back to the penstock 22 at a reduced level depending upon the flow head. The compressed air, along with fuel, is burned in the gas turbine 26 producing electrical power output which is in addition to the electrical power generated by hydro-electric system 14. The total power available from such an arrangement is shown in curves F, G and H of FIG. 3.

The overall increase in power output for reasonable and presently used components will be of the order of one and one half to three times that of the system 14 hydraulic turbine alone, depending upon the flow head available. This increase is, of course, realized through the addition of fuel to the gas turbine. In this instance, however, the gas turbine 28, unlike the standard Brayton Cycle, used in central power plants, is now divorced from its compressor and hence its characteristics change. In the instance when the gas turbine does not drive a compressor, but rather is supplied with a constant source of compressed air as system 26 in FIG. 1, the power available per cubic foot of air per second or per pound of air per seconds continues to increase with increasing pressure ratio. Where the gas turbine has to drive its own compressor, there is an optimum pressure ratio, for each allowable temperature, at which a maximum power output is obtained. With ever increasing pressure ratios for a given temperature, the output eventually reduces to zero.

In addition to greater power output of the gas turbine without a conventional compressor, fuel economy is realized due to the fact that fuel does not have to be supplied to a compressor.

Further standard refinements are applicable to the hydraulic air compressor gas turbine cycle such as regeneration, etc. Insertion of a regenerator does not produce a greater output capacity, from a given turbine at a given pressure ratio, but regeneration will materially reduce the fuel input requirement to attain the same output capacity.

The theoretical thermodynamic cycle associated with the combined hydraulic compressor and gas turbine is unique in that the cycle achieves the results of an infinite number of intercooler and recompression stages as utilized in standard installations without the use of these additional elements. Thus, we have a system consisting of a hydraulic air compressor 36 and gas turbine system 26 superimposed on a hydro-electric system 14 in which the overall result is to increase the total available output capacity of either system. This system is adaptable particularly to the pump back system of producing peak power, because operating in the ranges of present practice the overall output can be increased from one and one half to three times that of the hydro-electric system 14 alone.

While it is evident that the above proposed system is applicable to pump-back operation, it is also applicable to standard hydro-electric dam turbine generator systems. The advantage here being the conservation of water resources through being able to use the same water more than once for producing power. With the standard dam system in times of plentiful water this is of small consequence, however, with reduced water flow when some installations are forced to terminate generation, if fitted with the present system they could produce more energy per cubic foot of water flowing.

While the invention has been described with a certain degree of particularity it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element or step thereof is entitled.

What is claimed:

1. A system for generating electrical energy utilizing combined water power and combustible fuel sources comprising:
   (a) an elevated body of water, such as a lake;
   (b) a fuel powered turbine generator means having fuel and compressed air inputs;
   (c) a hydraulic air compressor means adjacent said body of water in the form of
      (1) a subterranean cavity of elevation lower than said body of water,
      (2) a water inlet connected from said body of water,
      (3) having an atmospheric air inlet as a part of said water inlet whereby air is drawn into said water inlet, the air being compressed by the water passing into the cavity, the compressed air being accumulated in the cavity;
      (4) a water outlet, the head of which is below the hydraulic head of said water inlet, and
      (5) a compressed air outlet connected to said turbine generator compressed air input; and
   (d) means to control the flow of water to said hydraulic air compressor and air flow to said turbine generator means, whereby electricity may be generated utilizing as energy sources water power and combustible fuel.

2. A system for generating electrical energy utilizing combined water power and combustible fuel sources comprising:
   (a) an elevated body of water;
   (b) a hydraulic electrical energy generating means positioned at a lower elevation;
   (c) a penstock connecting said body of water and said generating means;
   (d) a fuel powered turbine generator means having fuel and compressed air inputs;
   (e) an underground chamber adjacent and elevationally below said body of water;
   (f) a hydraulic standpipe communicating at its lower end with said underground chamber;
   (g) means to selectably direct flow from said elevated body of water to the upper end of said standpipe;
   (h) means to entrain atmospheric air in water flowing downwardly through said standpipe;
   (i) a riser pipe having its lower end communicating with said chamber and its upper end at an elevation below said body of water, water flowing into said chamber through said standpipe flowing out through the riser, air entrained in water flowing downwardly through said standpipe being compressed and released in said chamber and collected under pressure in the upper portion of said chamber;
   (j) an air outlet pipe having one end communicating with the upper portion of said chamber and the other end connected to said gas turbine compressed air inlet; and
   (k) means to control the flow of water to said hydraulic generating means and said standpipe and air flow to said turbine generator means, whereby electricity may be generated utilizing as energy sources water power and combustible fuel according to parameters of availability and economics.

3. A system for generating electrical energy according to claim 2 including:
   (1) a second body of water positioned adjacent to and elevationally lower than said elevated body of water, and wherein said hydraulic electrical generating means is of a pump-back arrangement and may be thereby used to pump water from said second body of water up to said elevated body as an energy storage means.

* * * * *